United States Patent
Keller et al.

(10) Patent No.: US 11,445,560 B2
(45) Date of Patent: Sep. 13, 2022

(54) METHOD OF ESTABLISHING A VOICE OVER INTERNET PROTOCOL, VOIP, CALL BETWEEN A CALLING USER EQUIPMENT, UE, AND A CALLED UE

(71) Applicant: Telefonaktiebolaget LM Ericsson (publ), Stockholm (SE)

(72) Inventors: Ralf Keller, Würselen (DE); Afshin Abtin, Sollentuna (SE); Venkata Ramesh Balabhadruni, Kista (SE); Jinyin Zhu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 162 days.

(21) Appl. No.: 16/627,180

(22) PCT Filed: Oct. 30, 2017

(86) PCT No.: PCT/EP2017/077815
§ 371 (c)(1),
(2) Date: Dec. 27, 2019

(87) PCT Pub. No.: WO2019/001749
PCT Pub. Date: Jan. 3, 2019

(65) Prior Publication Data
US 2020/0170064 A1    May 28, 2020

Related U.S. Application Data
(60) Provisional application No. 62/527,645, filed on Jun. 30, 2017.

(51) Int. Cl.
*H04W 76/18*    (2018.01)
*H04L 65/10*    (2022.01)
(Continued)

(52) U.S. Cl.
CPC .......... *H04W 76/18* (2018.02); *H04L 65/1006* (2013.01); *H04L 65/1016* (2013.01); *H04L 65/1069* (2013.01); *H04W 88/16* (2013.01)

(58) Field of Classification Search
CPC .................. H04W 76/18; H04W 88/16; H04L 65/1006; H04L 65/1016; H04L 65/1069
See application file for complete search history.

(56) References Cited

U.S. PATENT DOCUMENTS

| 8,165,582 B2 * | 4/2012 | Bishop ................ H04L 65/1073 455/435.1 |
| 2009/0116477 A1 * | 5/2009 | Belling ............. H04L 29/06027 370/386 |

(Continued)

FOREIGN PATENT DOCUMENTS

WO    2009039886 A1    4/2009

OTHER PUBLICATIONS

Unknown, Author, "3rd Generation Partnership Project; Technical Specification Group Core Network and Terminals; IP multimedia call control protocol based on Session Initiation Protocol (SIP) and Session Description Protocol (SDP); Stage 3 (Release 14)", 3GPP TS 24.229 V14.3.1, Mar. 2017, pp. 1-979.

(Continued)

*Primary Examiner* — Brenda H Pham
(74) *Attorney, Agent, or Firm* — Murphy, Bilak & Homilier, PLLC

(57) ABSTRACT

A method of establishing a Voice over Internet Protocol, VoI P, call between a calling User Equipment, UE, and a called UE, wherein said calling UE is served by a core network via a packet-switched radio access network, PS-RAN, and wherein a bearer is to be established between said calling U E and a gateway node in said core network, over said PS-RAN, for obtaining access to an Internet Protocol, IP, multimedia subsystem, I MS, network, wherein said method (Continued)

comprises the steps receiving, by a an IMS Call Session Control Function, CSCF, node a notification message thereby notifying said I MS node that said VoIP call establishment is in progress and initiating, by said I MS CSCF, re-establishment of said bearer between said calling UE and said gateway node, over said PS-RAN, in case said establishment of said bearer has failed due to a temporary failure.

14 Claims, 10 Drawing Sheets

(51) Int. Cl.
*H04L 65/1016* (2022.01)
*H04L 65/1069* (2022.01)
*H04W 88/16* (2009.01)

(56) References Cited

U.S. PATENT DOCUMENTS

| | | | |
|---|---|---|---|
| 2010/0195644 A1* | 8/2010 | Hao | H04W 36/0022 370/352 |
| 2013/0016658 A1 | 1/2013 | Lövsén et al. | |
| 2015/0245408 A1* | 8/2015 | Watanabe | H04W 76/19 370/329 |

OTHER PUBLICATIONS

Unknown, Author, "3rd Generation Partnership Project; Technical Specification Group Core Network and Terminals; Non-Access-Stratum (NAS) protocol for Evolved Packet System (EPS); Stage 3 (Release 15)", 3GPP TS 24.301 V15.7.0, Jun. 2019, pp. 1-539.

Unknown, Author, "3rd Generation Partnership Project; Technical Specification Group Core Network and Terminals; Policy and Charging Control (PCC); Reference points (Release 14)", 3GPP TS 29.212 V14.4.0, Jun. 2017, pp. 1-277.

Unknown, Author, "3rd Generation Partnership Project; Technical Specification Group Core Network and Terminals; Policy and Charging Control over Rx reference point (Release 14) The present", 3GPP TS 29.214 V14.1.0, Sep. 2016, pp. 1-76.

Unknown, Author, "3rd Generation Partnership Project; Technical Specification Group Services and System Aspects; General Packet Radio Service (GPRS) enhancements for Evolved Universal Terrestrial Radio Access Network (E-UTRAN) access (Release 12) The", 3GPP TS 23.401 V12.11.0, Mar. 2016, pp. 1-310.

Unknown, Author, "3rd Generation Partnership Project; Technical Specification Group Services and System Aspects; General Packet Radio Service (GPRS) enhancements for Evolved Universal Terrestrial Radio Access Network (E-UTRAN) access (Release 14) The present", 3GPP TS 23.401 V14.1.0, Sep. 2016, pp. 1-379.

Unknown, Author, "3rd Generation Partnership Project; Technical Specification Group Services and System Aspects; General Packet Radio Service (GPRS) enhancements for Evolved Universal Terrestrial Radio Access Network (E-UTRAN) access (Release 15) The present", 3GPP TS 23.401 V15.0.0, Jun. 2017, pp. 1-386.

Unknown, Author, "3rd Generation Partnership Project; Technical Specification Group Services and System Aspects; Procedures for the 5G System; Stage 2 (Release 15)", 3GPP TS 23.502 V0.4.0, May 2017, pp. 1-126.

Unknown, Author, "3rd Generation Partnership Project; Technical Specification Group Services and System Aspects; System Architecture for the 5G System; Stage 2 (Release 15)", 3GPP TS 23.501 V0.5.0, May 2017, pp. 1-145.

Unknown, Author, "IMS Profile for Voice and SMS", IR.92; Version 10.0; GSM Association, May 18, 2016, pp. 1-49.

* cited by examiner

METHOD OF ESTABLISHING A VOICE OVER INTERNET PROTOCOL, VOIP, CALL BETWEEN A CALLING USER EQUIPMENT, UE, AND A CALLED UE

TECHNICAL FIELD

The present disclosure is directed to the establishment of VoIP calls between a calling UE and a called UE and, more specifically, to mechanisms to retry establishment of a bearer in case the initial bearer establishment has failed due to a temporary failure.

BACKGROUND

The Long-Term Evolution, LTE, wireless system developed by members of the 3rd-Generation Partnership Project supports voice calls that use a dedicated packet-switched bearer, rather than the conventional circuit-switched bearers. This technology is referred to as voice-over-LTE, VoLTE, and is based on the Internet Protocol, IP, Multimedia Subsystem, IMS, network. This approach results in the voice service, i.e. the control and media planes, being delivered as data flows within an LTE data bearer. This means that there is no dependency on, or ultimately, requirement for, the legacy circuit-switched voice network to be maintained. Standards for Single Radio Voice Call Continuity, SRVCC, have been developed to provide for the support of VoLTE calls to legacy, i.e. circuit-switched, networks in a transparent manner. In addition, support for Circuit-Switched Fall Back, CSFB, has been developed, to provide a circuit-switched backup or alternative to VoLTE calls.

It is noted that that, typically, it is the Public Data Network, PDN, Gateway, or PGW node, that sets up a data bearer with the calling user equipment, UE, via a Serving Gateway, SGW, node for the calling UE, the Mobility Management Entity, MME, and the access node, for example the Evolved nodeB, eNB. Such a bearer is required for obtaining access to the IMS network.

Current specifications provide for retry of call origination by an IMS Application Server, AS, after failure of an attempt to establish a call over the LTE access network, with the retry being formed over circuit-switched access, resulting in an CSFB.

Typically, a Session Initiation Protocol, SIP, INVITE message begins a call establishment over a packet-switched access, for example an LTE access network. The call establishment over the LTE access network may fail for any particular reason. The receipt of a SIP error code at the IMS AS and/or the expiration of one or more timers governing the call establishment, mar trigger a retry via circuit-switched access, instead of the initial packet-switched access using the LTE access network, resulting in CSFB.

A failed call setup originated by a UE may also result in a retry over circuit-switched access, in some circumstances. Procedures for indicating to the UE that it should use circuit-switched access, if possible, when a mobile-originated call setup fails are defined 3GPP and GSM Association, GSMA, documents, e.g., GSMA IR.92., version 11 and 3GPP TS 24.229:

3GPP TS 24.229 Annex L.5:

NOTE 2: If the UE has sent an INVITE request including voice codecs, receives a 500 (Server Internal Error) response to this INVITE request containing no Retry-After header field, including a Reason header field with a protocol value set to "FAILURE_CAUSE" including a cause value header field parameter set to "1" as specified in subclause 7.2A.18.12.2, a Response-Source header field with a "fe" header field parameter set to "<urn:3gpp:fe:orig.p-cscf.orig>", and the UE is attached to both Packet Switched, PS, and Circuit Switched, CS, domains, the UE can attempt the voice call via the CS domain, e.g. by initiating a service request for CS fallback (see 3GPP TS 24.301 [8J]).

3GPP TS 24.229 Section 5.2.7.2:

When the P-CSCF responds to the UE with a 500 (Server Internal Error) response after receiving an indication that radio/bearer resources are not available, then based on operator policy, the P-CSCF may include a Reason header field with a protocol value set to "FAILURE_CAUSE" and a "cause" header field parameter set to "1" as specified in subclause 7.2A.18.12.2 and a Response-Source header field with a "fe" header field parameter set to "<urn:3gpp:fe:p-cscf.orig>".

Procedures for providing Radio Access Network (RAN)/Network Access Stratum (NAS) cause codes to the IMS network are defined in the following specifications, enabling IMS to be aware of the failure reasons, e.g., for troubleshooting/logging and regulatory reasons:

Rx Interface: 3GPP TS 29.214

Gx Interface: 3GPP TS 29.212

Procedures are defined in 3GPP TS 23.401 for retry bearer setup from PDN-GW, in case of temporary failure, for "temporary rejection due to TAU/RAU procedure," e.g. for TAU/RAU, S1 or X2 handovers:

Section 5.3.3: Tracking Area Update procedures

Section 5.3.3.0: Triggers for tracking area update.

. . . Upon reception of a rejection for an EPS bearer(s) PDN GW initiated procedure with an indication that the request has been temporarily rejected due to mobility procedure in progress, the PDN GW start a locally configured guard timer. The PDN GW shall re-attempt, up to a pre-configured number of times, when either it detects that the Tracking Area Update procedure is completed or has failed using message reception or at expiry of the guard timer.

Section 5.5.1 Intra-E-UTRAN handover

Section 5.5.1.1 X2-based handover

Section 5.5.1.1.1 General

Upon reception of a rejection for an EPS bearer(s) PDN GW initiated procedure with an indication that the request has been temporarily rejected due to handover procedure in progress, the PDN GW start a locally configured guard timer. The PDN GW shall re-attempt, up to a pre-configured number of times, when either it detects that the handover is completed or has failed using message reception or at expiry of the guard timer.

One problem with existing solutions is that if resource allocation, dedicated data bearer establishment, fails for VoLTE call setup, then in an area where there is no CS coverage, it is not possible to fall back to circuit-switched access to setup the call. In this situation, the call is determined to be failed.

SUMMARY

It is an objective to provide for a method of establishing a Voice over Internet Protocol, VoIP, call between a calling User Equipment, UE, and a called User Equipment, UE.

It is another objective to provide for devices supporting the establishment of Voice over Internet Protocol, VoIP, call between a calling User Equipment, UE, and a called User Equipment, UE.

In a first aspect, there is provided a method of establishing a Voice over Internet Protocol, VoIP, call between a calling User Equipment, UE, and a called UE, wherein said calling UE is served by a core network via a packet-switched radio access network, PS-RAN, and wherein a bearer is to be established between said calling UE and a gateway node in said core network, over said PS-RAN, for obtaining access to an Internet Protocol, IP, multimedia subsystem, IMS, network.

The method comprises the steps:
receiving, by a an IMS Call Session Control Function, CSCF, node a notification message thereby notifying said IMS node that said VoIP call establishment is in progress;
enabling, by said IMS CSCF, re-establishment of said bearer between said calling UE and said gateway node, over said PS-RAN, in case said establishment of said bearer has failed due to a temporary failure.

The inventors have noted that, if a call setup for a VoIP call, in particular a VoLTE call, fails, when there is no circuit-switched access available for backup, the call fails, even if the reason for the dedicated data bearer setup failure is a temporary one.

It was found that, in case the establishment of the bearer between the calling UE and the gateway node has failed due to a failure which is recognized as being a temporary failure, there is no need for the VoLTE call to fail. In such a case, retries of the procedure to establish the VoLTE call via the packet-switched RAN may be initiated to try establish the bearer again.

Various examples of the presently disclosed techniques address this problem by providing for retries of procedures to setup the call via packet-switched access, i.e., retries that include or trigger retries of attempts to setup dedicated data bearers. In some examples, these retries are limited by one or more constraints, e.g., being based at least partly on whether circuit-switched access is available, and may be restricted when, for example, the packet-switched access is overloaded. In some embodiments, the retries are triggered by certain cause codes associated with the initial failure to establish the dedicated data bearer.

The above described method is especially suitable for calling UE's that do not have access to a circuit-switched Radio Access Network. In the prior art, a VoIP call can then not be established in case the bearer establishment between the calling UE and the gateway node has failed. The prior art dictates that, in such a case, a retry should be initiated over the circuit switched domain. This particular calling UE, however, does not have access to a circuit switched RAN.

The above does not exclude the possibility that the present disclosure may also be suitable for UE's that do have circuit switched and packet switched connectivity.

The present disclosure describes several examples of methods for retrying the bearer establishment over the packet switched network from a 4G-LTE-Evolved Packet Core, EPC, perspective. It will be appreciated, however, that these solutions are equally applicable to emerging 5G networks, which will include network nodes with similar roles as the 4G nodes described herein. It will be understood, however, that these nodes may have different names, and their respective functionalities may be partitioned differently. Accordingly, it should be understood that the several steps described herein may be performed by nodes having different names and different feature sets from those referred to herein.

In accordance with the present disclosure, the CSCF is a Proxy-CSCF which may be the entry point to the IMS network and may serve as an outbound proxy node for any UE. The calling UE may attach to the P-CSCF prior to perform IMS registrations and initiating Session Initiation Protocol, SIP, sessions. The P-CSCF may be in the home domain of the IMS operator, or it may be in the visiting domain, where the UE is currently roaming.

In accordance with the present disclosure, the gateway node may reside in the core network and is, for example, a Public Data Network Gateway, PGW, node. The PGW node may provide connectivity for any UE in the telecommunication network to external packet data networks such as the IMS network, by being the point of exit and entry of traffic for the UE. A UE may have simultaneous connectivity with more than one PGW for accessing multiple PDNs. Alternatively, the gateway node is a Serving Gateway, SGW.

In accordance with the present disclosure, a PS-RAN is, for example, the Evolved Universal Terrestrial Radio Access Network, E-UTRAN, for 4G connectivity or the 5G RAN for 5G connectivity, both of which are packet switched networks.

In accordance with the present disclosure, a Voice over Internet Protocol, IP, call establishment is disclosed, wherein, preferably, said VoIP call is a Voice over Long Term Evolution, LTE, VoLTE Call.

It is further noted that the present disclosure is drafted from a point of view that the calling UE intends to establish a VoIP call to a called UE. It is noted that the present invention is not coupled sec to the calling UE or the called UE. The present disclosure is focussed on the fact that the telecommunication network supports a retry of the establishment of the VoIP call over the PS network. The remote end UE is then of no importance.

In an example, the step of enabling comprises:
providing, by said IMS CSCF, to said gateway node, a list of failure cause codes for which said gateway node is allowed to retry establishment of said bearer.

The above described example is directed to the situation in which the gateway node may retry bearer creation if it is indicated, by the IMS CSCF, that the corresponding failure cause code is considered temporary. As such, once the initial bearer establishment has failed, and the gateway node determines that the cause for the failure matches an entry in the list of failure cause codes received from the IMS CSCF, the gateway node may simply retry to establish that same bearer. In such a case, it is not necessary to contact the IMS CSCF again, thereby reducing the amount of signalling in the network.

Such a provision may traverse intermediate nodes like the PCRF.

In another example, said step of enabling comprises:
receiving, by said IMS CSCF, a failure message thereby indicating that said bearer establishment between said calling UE and said gateway node has failed;
determining, by said IMS CSCF, that said failure message comprises an indication that said failure is temporary;
requesting, by said IMS CSCF, said gateway node, to re-establish said bearer between said calling UE and said gateway node.

The failure message is, for example, a Session Termination Answer, STA, message received from a Policy and charging rules function, PCRF, node or received from the gateway node itself.

In this particular example, the IMS CSCF is in the lead. This means that the IMS CSCF determines what should happen in case the bearer establishment between the calling UE and the gateway node has failed. More particularly, it is decided that the gateway node is requested to re-establish the bearer between the calling UE and the gateway node in case the failure message comprises an indication that said corresponding failure is temporary.

Such a request may be sent via the PCRF node in a Authorize/Authenticate-Request, AAR, message.

In a further example, said step of initiating comprises:
receiving, by said IMS CSCF, a failure message thereby indicating that said bearer establishment between said calling UE and said gateway node has failed;
determining, by said IMS CSCF, that said failure message comprises an indication that said failure is temporary;
requesting, by said IMS CSCF, said calling UE to re-establishing said Voice over Internet Protocol, VoIP, call between a calling User Equipment, UE, and said called UE via said packet-switched radio access network, PS-RAN.

In this particular example, the IM CSCF is also in the lead. This means that the IMS CSCF determines what should happen in case the bearer establishment between the calling UE and the gateway node has failed. More particularly, it is decided that the calling UE is requested to re-establish the VoIP call between calling UE and the called UE via the packet-switched radio access network.

Such a request may be sent to the calling UE in a 500 Server Internal Error message, wherein the IMS CSCF indicated to the UE that it could not fulfil the request due to some unexpected condition.

In an example, the temporary failure is communicated based on any of
a Radio Access Network, RAN, cause code;
a Non Access Stratum, NAS, cause code;
a General Packet Radio Service Tunnelling Protocol, GTP, cause code.

The above may be based on configuration of the CSCF.

More specifically, the cause codes may be a dedicated cause code indicating a temporary failure.

In a second aspect, there is provided a method of establishing a Voice over Internet Protocol, VoIP, call between a calling User Equipment, UE, and a called UE, wherein said calling UE is served by a core network via a packet-switched radio access network, PS-RAN, and wherein a bearer is to be established between said calling UE and a gateway node in said core network, over said PS-RAN, for obtaining access to an Internet Protocol, IP, multimedia subsystem, IMS, network, wherein said method comprises the steps:
establishing, by said gateway node, said bearer between said calling UE and said gateway node;
determining, by said gateway node, that said bearer establishment has failed due to a temporary failure;
re-establishing, by said gateway node, said bearer between said calling UE and said gateway node.

The advantages of the first aspect of the disclosure being a method of establishing a VoIP call between a calling UE and a called UE are also inherently a part of the second aspect of the disclosure.

In an example, said method further comprises the step of:
receiving, by said gateway node, from an IMS Call Session Control Function, CSCF, node, a list of failure cause codes for which said gateway node is allowed to retry establishment of said bearer;
and wherein said step of determining comprises:
determining, by said gateway node, that said bearer establishment has failed due to a temporary failure based on said received list of failure cause codes.

In a second aspect, there is provided a method for establishing a Voice over Internet Protocol, VoIP, call between a calling User Equipment, UE, and a called UE, wherein said calling UE is served by a packet switched, PS, core network via a radio access network, RAN, and wherein a bearer is to be established between said calling UE and a gateway node in said PS core network, over said RAN, for obtaining access to an Internet Protocol, IP, multimedia subsystem, IMS, network, wherein said method comprises the steps of:
transmitting, by said calling UE, a request message for requesting establishment of said VoIP call;
receiving, by said calling UE, a service unavailable message indicating that said establishment of said bearer has failed and comprising an indication that said calling UE should retry said establishment of said VoIP call;
re-transmitting, by said calling UE, said request message for requesting establishment of said VoIP call.

Alternatively, the calling UE may re-register to the IMS network instead of re-transmitting the request message.

The above described second aspect of the present disclosure is directed to the method steps that are performed by the gateway node, for example a Public Data Network Gateway, PGW, node that resides in the core part of the telecommunication network. The gateway node may also be a User Plane Function, UPF, or a Session Management Function, SMF, as known in 5G telecommunication network.

In a fourth aspect, there is provided an Internet Protocol, IP, Multimedia Subsystem, IMS, Call Session Control Function, CSCF, for supporting establishment of a Voice over Internet Protocol, VoIP, call between a calling User Equipment, UE, and a called UE, wherein said calling UE is served by a core network via a packet-switched radio access network, PS-RAN, and wherein a bearer is to be established between said calling UE and a gateway node in said core network, over said PS-RAN, for obtaining access to said IMS network.

The IMS CSCF node comprises:
receive equipment arranged for receiving a notification message thereby notifying said IMS node that said VoIP call establishment is in progress;
process equipment arranged for enabling re-establishment of said bearer between said calling UE and said gateway node, over said PS-RAN, in case said establishment of said bearer has failed due to a temporary failure.

The advantages of the first and second aspect of the disclosure being a method, and a gateway node, of establishing a VoIP call between a calling UE and a called UE are also inherently a part of the third aspect of the disclosure.

The above described third aspect of the present disclosure is directed to the method steps that are performed by the IMS CSCF node, for example a Proxy CSCF, an Interrogating CSCF or a subscriber CSCF.

In an example, the IMS CSCF node further comprises:
transmit equipment arranged for providing a list of failure cause codes for which said gateway node is allowed to retry establishment of said bearer.

In another example, the process equipment is further arranged for:
receiving a failure message thereby indicating that said bearer establishment between said calling UE and said gateway node has failed;
determining that said failure message comprises an indication that said failure is temporary;
requesting said gateway node, to re-establish said bearer between said calling UE and said gateway node.

In another example, the process equipment is further arranged for:
receiving a failure message thereby indicating that said bearer establishment between said calling UE and said gateway node has failed;
determining that said failure message comprises an indication that said failure is temporary;
requesting said calling UE to re-establishing said Voice over Internet Protocol, VoIP, call between a calling User Equipment, UE, and said called UE via said packet-switched radio access network, PS-RAN.

In a further example, the temporary failure is communicated based on any of
a Radio Access Network, RAN, cause code;
a Non Access Stratum, NAS, cause code;
a General Packet Radio Service Tunnelling Protocol, GTP, cause code.

More particularly, the cause code may be a dedicated cause code for indicating a temporary failure.

In a fifth aspect, there is provided a gateway node arranged for supporting establishment of a Voice over Internet Protocol, VoIP, call between a calling User Equipment, UE, and a called UE, wherein said calling UE is served by a core network via a packet-switched radio access network, PS-RAN, and wherein a bearer is to be established between said calling UE and said gateway node in said core network, over said PS-RAN, for obtaining access to an Internet Protocol, IP, multimedia subsystem, IMS, network.

The gateway node comprises:
establish equipment arranged for establishing said bearer between said calling UE and said gateway node;
process equipment arranged for determining that said bearer establishment has failed due to a temporary failure;
re-establish equipment arranged for re-establishing said bearer between said calling UE and said gateway node.

The advantages of the first, second and third aspect of the disclosure being a method, a gateway node and an IMS CSCF node, of establishing a VoIP call between a calling UE and a called UE are also inherently a part of the fourth aspect of the disclosure.

In an example, the gateway node further comprises:
receive equipment arranged for receiving, from an IMS Call Session Control Function, CSCF, node, a list of failure cause codes for which said gateway node is allowed to retry establishment of said bearer;
and wherein said process equipment is further arranged for determining that said bearer establishment has failed due to a temporary failure based on said received list of failure cause codes.

In a sixth aspect, there is provided a Calling User Equipment, UE, for establishing a Voice over Internet Protocol, VoIP, call between said calling UE and a called UE, wherein said calling UE is served by a packet switched, PS, core network via a radio access network, RAN, and wherein a bearer is to be established between said calling UE and a gateway node in said PS core network, over said RAN, for obtaining access to an Internet Protocol, IP, multimedia subsystem, IMS, network, wherein said calling UE comprises:
transmit equipment arranged for transmitting a request message for requesting establishment of said VoIP call;
receive equipment arranged for receiving a service unavailable message indicating that said establishment of said bearer has failed and comprising an indication that said calling UE should retry said establishment of said VoIP call;
re-transmit equipment arranged for re-transmitting said request message for requesting establishment of said VoIP call.

Alternatively, the re-transmit equipment may be arranged for request re-registration in the IMS network.

In a seventh aspect, there is provided a non-transitory computer-readable storage medium, comprising instructions which, when executed on at least one processor, cause the at least one processor to carry out the method according to any of the method examples as provided above.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
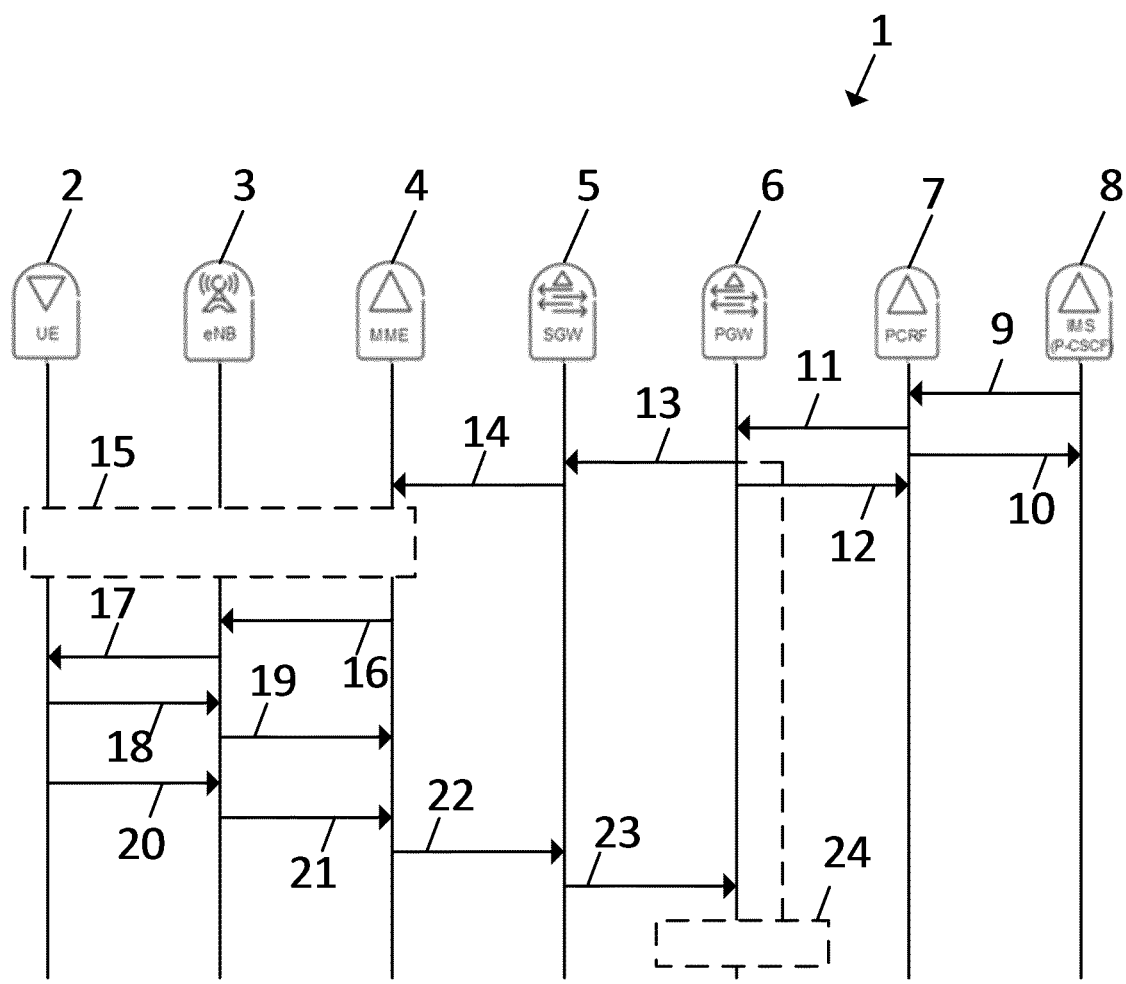
FIG. 1 illustrates a successful resource allocation for establishment of a dedicated data bearer.

FIG. 1 is a signalling flow diagram 1 illustrating a successful VoLTE call setup in an LTE network, and, more specifically, a successful data bearer establishment initiated from the IMS network, e.g., by the Proxy-Call Session Control Function, P-CSCF. The steps illustrated in FIG. 1 are well documented in existing 3GPP standards, e.g., in the standards documents identified in the list of references provided 20 below. Note that it is the Public Data Network, PDN, Gateway, or "PGW," that sets up the data bearer with the user equipment, UE-3GPP terminology for a wireless device configured to access a wireless network, via the Serving Gateway, SGW, for the UE, the Mobility Management Entity, MME, and evolved nodeB, i.e. 3GPP terminology for the LTE base station.

A reference list for the signalling flow diagram as illustrated in FIG. 1 is provided here below.
Reference numeral 2 is the calling UE.
Reference numeral 3 is the access node 3 in the packet switched radio access network to which the calling UE 2 directly communicates. More specifically, the access node 3 is the evolved node B.
Reference numeral 4 is the Mobility Management Entity, MME.
Reference numeral 5 is the Serving Gateway, SGW.
Reference numeral 6 is the Packet Gateway, PGW.

Reference numeral 7 is the Policy and charging rules function.

Reference numeral 8 is the Internet Protocol, IP, Multimedia Subsystem, IMS Proxy Call Serving Control Function, P-CSCF.

Reference numeral 9 is an Authorize/Authenticate-Request, AAR, message send from the P-CSCF 8 to the PCRF 7.

Reference numeral 10 is an Authentication Authorization Accounting, AAA, message send from the PCRF 7 to the P-CSCF 8.

Reference numeral 11 is a Re-Auth-Request, RAR, message sent from the PCRF 7 to the PGW 6.

Reference numeral 12 is a Re-Auth-Answer, RAA, message send from the PGW 6 to the PCRF 7.

Reference numeral 13 is a create bearer request message sent from the PGW 6 to the SGW 5.

Reference numeral 14 is a create bearer request message sent from the SGW 5 to the MME 4.

Reference numeral 15 indicates conditional paging functionality.

Reference numeral 16 indicates an E-UTRAN Radio Access Bearer, E-RAB, establishment request messages sent from the MME 4 to the eNB 3.

Reference numeral 17 indicates a Radio Resource Control, RRC, reconfiguration message sent from the eNB 3 to the calling UE 2.

Reference numeral 18 indicates a RRC reconfiguration complete message sent from the calling UE 2 to the eNB 3.

Reference numeral 19 indicates an E-RAB establishment response message sent from the eNB 3 to the MME 4.

Reference numeral 20 indicates a Direct Transfer message sent from the calling UE 2 to the eNB 3.

Reference numeral 21 indicates a Session Management response message sent from the eNB 3 to the MME 4.

Reference numeral 22 indicates a create bearer response message sent from the MME 4 to the SGW 5.

Reference numeral 23 indicates a create bearer response message sent from the SGW 5 to the PGW 6.

Reference numeral 24 indicates that if additional bearers are to be established, the same process is to begin starting from the create bearer request message as sent by the PGW 6 to the SGW 5.

Figure 2:
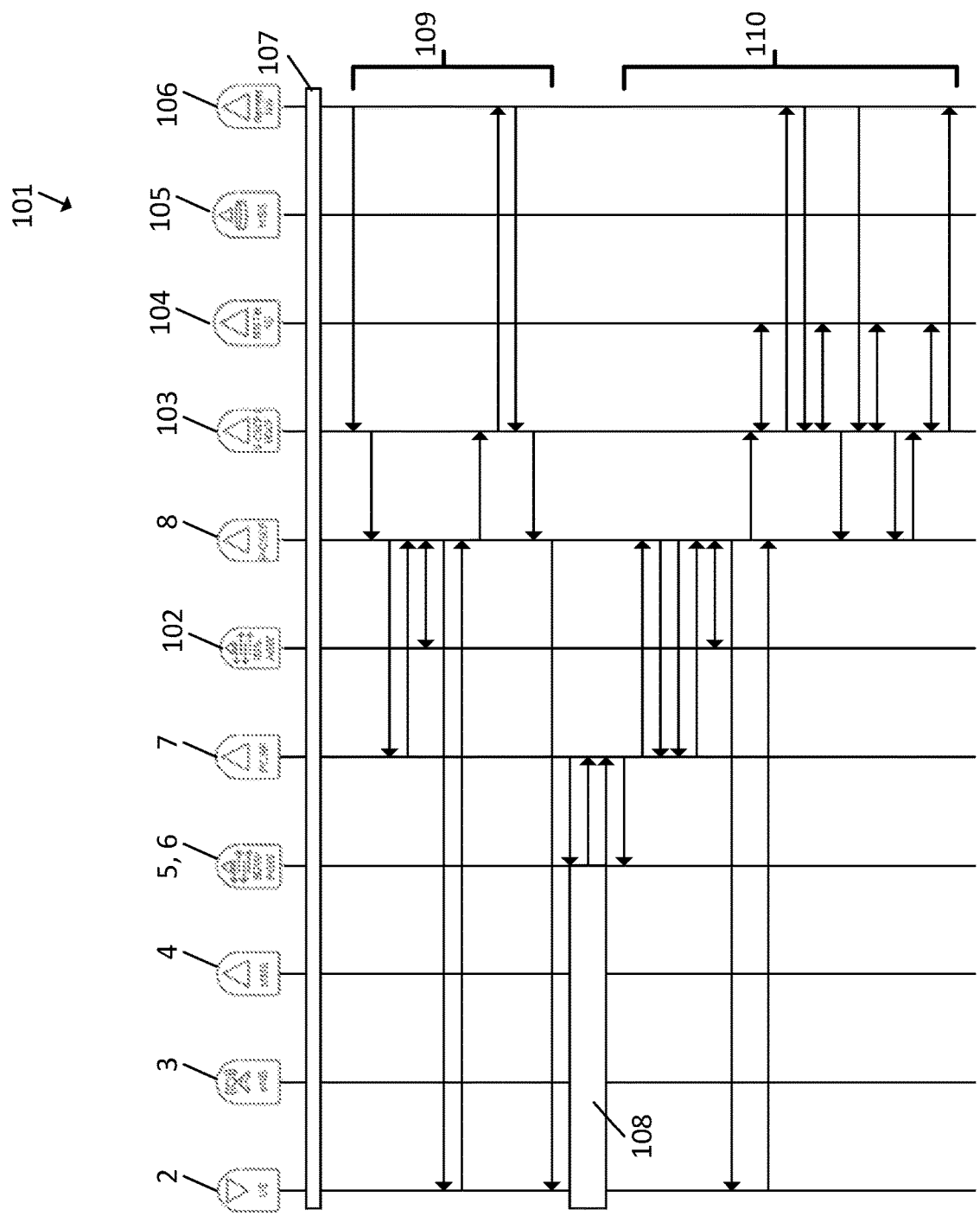
FIG. 2 illustrates an example of a failed data bearer establishment.

FIG. 2, on the other hand, illustrates a failed resource reservation i.e., a failed bearer establishment, for a VoLTE call initiated by the user equipment. Again, the steps illustrated in this figure are well documented in existing 3GPP standards. It should be noted here that the failed establishment of a bearer—referred to in the figure as a failed Evolved Packet Subsystem, EPS, resource reservation—occurs between the PGW/SGW and the UE, and may have any of a number of causes. While FIG. 2 illustrates a failed data bearer establishment for a UE-originated call, it will be appreciated that a similar failure can result when a call is originated by the IMS network, e.g., by an IMS Application Server, IMS AS.

It is noted that in a request 107 that is sent by the calling UE 2 to establish a VoIP session with a called UE, multiple nodes in the network may be involved. The IMS-AGW 102, the S-CSCF 103, the MMTel-AS 104, the HSS 105 and a remote NW 106 may all be part of the signalling process In addition to the nodes as indicated with FIG. 1.

The first part 109 of the signalling accompanied by the request 107 sent by the calling UE 2 as well as the second part 110 of the signalling accompanied by the request 107 sent by the calling UE 2 will not be explained in detail. These steps are well documented by existing 3GPP standards.

In the present scenario, it is noted that the establishment of the bearer between the calling UE and the PGW has failed 108 for any particular reason.

Figure 3:
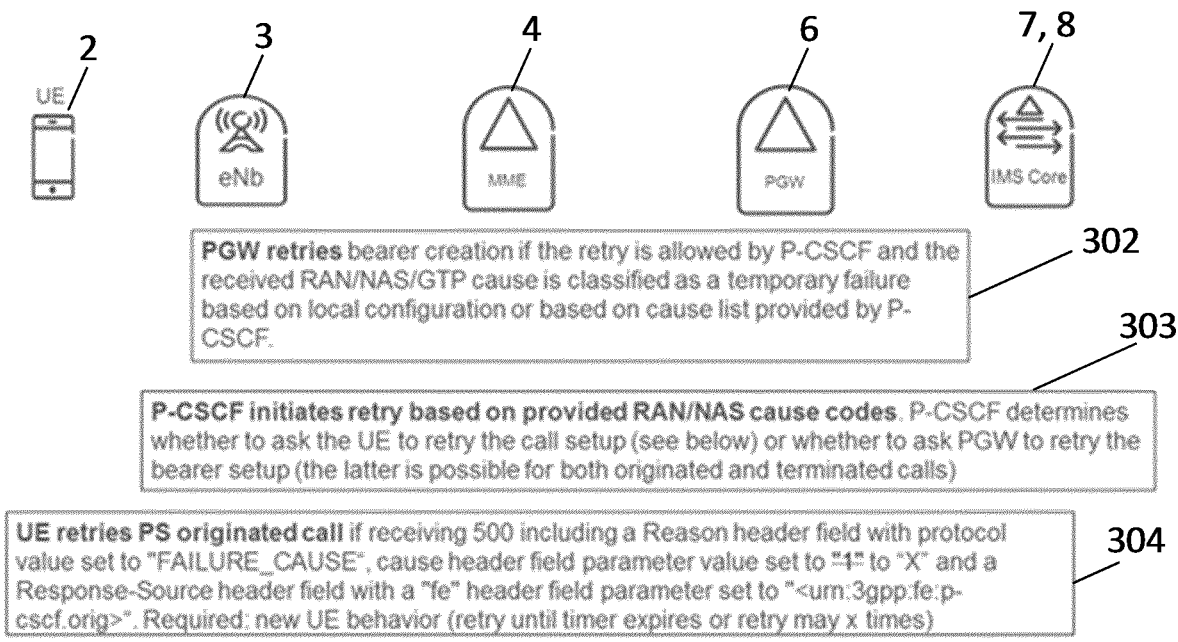
FIG. 3 illustrates IMS Application Server-level retry to circuit-switched access.

Current specifications provide for retry of call origination by an IMS AS, after failure of an attempt to setup a call over LTE, with the retry being formed over circuit-switched access, resulting in an CSFB. This is shown in FIG. 3. As shown at step 202, a SIP INVITE message begins a call setup over packet-switched access 204. the call setup over LTE 204 may fail. The receipt of a SIP error code at the IMS AS and/or the expiration of one or more timers governing the call setup may trigger a retry via circuit-switched access 205 resulting in CSFB.

Figure 4:
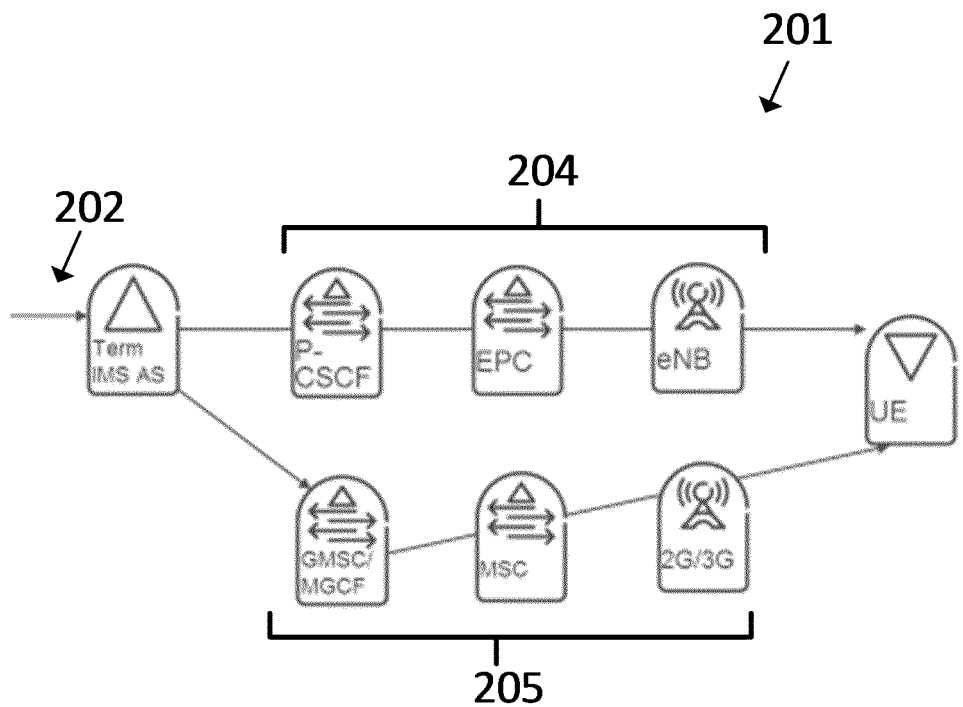
FIG. 4 illustrates example solutions for retry of data bearer establishments.

FIG. 4 illustrates 301 an overview of several approaches to packet-switched retries 302, 303, 304 that are covered by the present disclosure. As seen in the figure, these several solutions include PGW-based solutions, e.g., where the PGW node responds to a failed bearer establishment by retrying the bearer creation.

This may be conditioned, in some embodiments, on whether the retry is allowed by the IMS network, e.g., by the P-CSCF, and may instead or also be conditioned on the cause for the bearer establishment failure being classified as a temporary failure, e.g., based on local configuration on a list of cause codes provided to the PGW node by the P-CSCF node or any other network node.

Other solutions include P-CSCF-based solutions, e.g., where the P-CSCF initiates retry of call setup over packet-switched access based on, for example, a RAN/NAS cause code for the failed bearer establishment provided to the P-CSCF node.

In various embodiments, the P-CSCF node may determine whether to ask calling UE to retry the call establishment, or whether to ask the PGW node to retry the bearer establishment. The latter is possible for both originated and terminated calls.

Still other solutions are UE-based, e.g., where the UE is configured to retry packet-switched call setup of a mobile originated call if it receives a 500 error including a Reason header filed with protocol value set to "FAILURE CAUSE," cause header filed parameter value set to some predetermined value "X," and a Response-Source header filed with a "fe" header field parameter set to "<urn:3gpp:fe:p-cscf.orig>." Of course, this approach may require new UE behavior. UE behaviors may be limited by a timer and/or by a number of retry attempts, in some embodiments.

Figure 5:
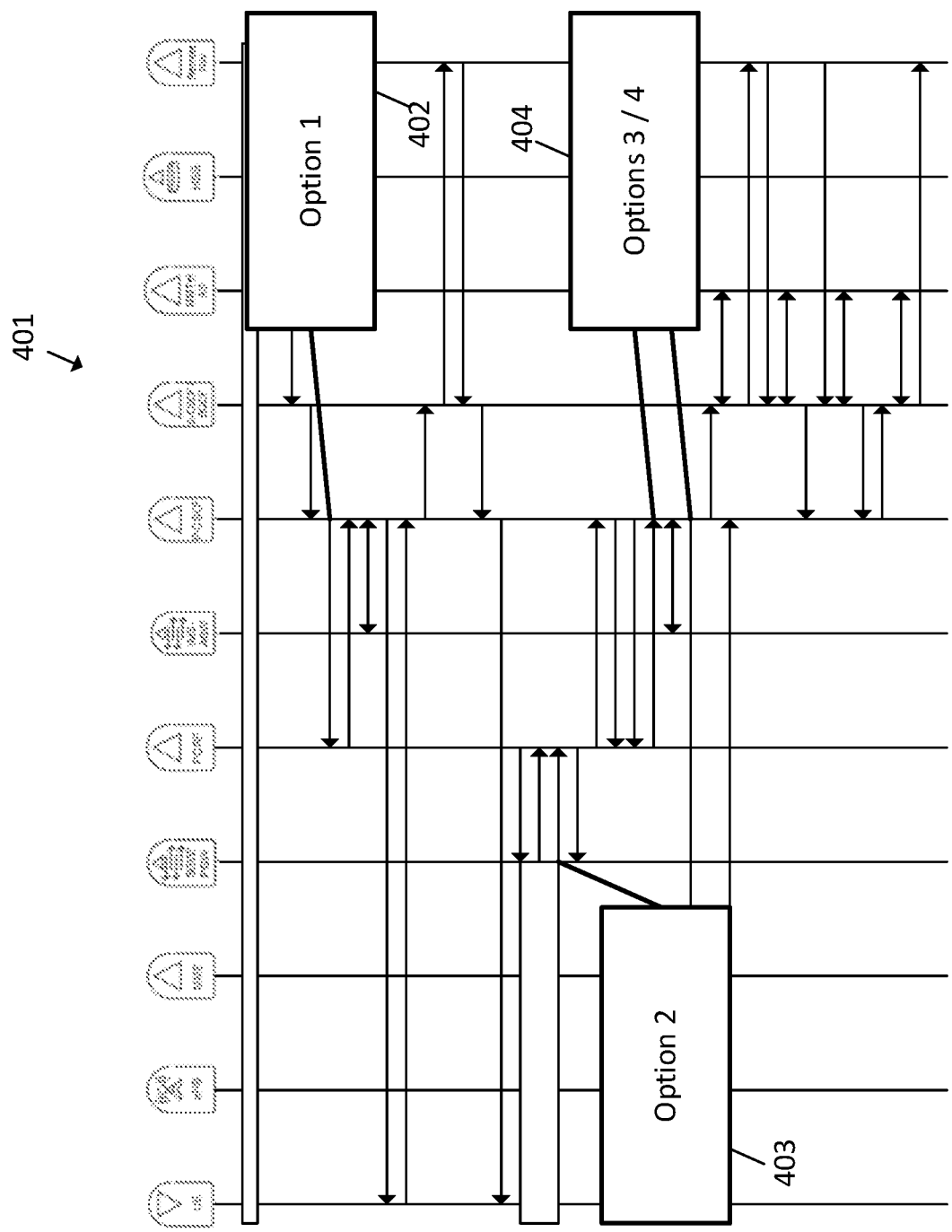
FIG. 5 illustrates the mapping of example solutions for retry of data bearer establishments to a signal flow diagram illustrating a failed data bearer establishment.

FIG. 5 illustrates 401 several examples of these solutions, as mapped to the signalling flow diagram of FIG. 2, which illustrated a failed call setup for a UE-initiated call. It will be appreciated that the illustrated mapping may be similar or the same for a network-initiated call setup, and should be further understood that the illustrated solutions are only examples of the several techniques described herein.

In a first group of solutions 403, PGW retry of bearer creation, for originating or terminating service, is based on local configuration and/or based on a P-CSCF-provided list 402 of RAN/NAS/GTP cause codes, in various embodiments. Of course, the provided list of cause codes may be pre-configured, in some embodiments, or received from a network node other than the P-CSCF.

For embodiments where PGW does not retry immediately when being informed about bearer setup failure, the PGW may follow the current 3GPP-defined procedure to indicate the data bearer establishment failure to the Policy Charging and Rules Function, PCRF, and then PCRF indicates the failure to P-CSCF. Note that neither PGW nor PCRF is typically aware of whether a given bearer setup is for an originated or for a terminated service.

In a second group of solutions 404, the P-CSCF decides, based on determining that a bearer establishment has failed, whether to indicate towards the calling UE to retry the originated call on packet-switched access. This indication could be, for example, via one or more dedicated cause codes that indicate to retry via to packet-switched access.

In other embodiments or instances, the P-CSCF may decide to indicate to an IMS AS or other node to retry call setup with the UE, via packet-switched access. Retrying the call setup via packet-switched access could mean trying, for example, a different possible packet-switched access means, such as when the UE has registered via both E-UTRAN and via WiFi.

Retrying the call establishment via packet-switched access could also mean, in some embodiments or instances, attempting call setup via packet-switched towards a different UE, e.g., when multiple UEs are known to be associated with a given UE. This may involve, for example, sequential hunting, or a selection from multiple UEs based on knowledge that a particular UE is not reachable.

In still other embodiments, the P-CSCF may indicate towards the UE that the UE should perform a new initial IMS registration. This may imply, in some embodiments, selecting a different P-CSCF, if possible, or even the tearing down and re-establishment of the PDCN connection.

In a third group of solutions, the UE follows instruction from the network and, in some embodiments, local information regarding the availability of circuit-switched access, to determine whether to, for example: retry the originated call setup via packet-switched access; retry the originated call setup via circuit-switched access; select a different P-CSCF, perform a new initial registration, and retry the call setup; or tear down and re-establish the PDN connection, select a P-CSCF, perform a new initial registration, and retry the call setup.

The various solutions presented herein provide for a re-establishment of data bearer setup in the event of temporary problems in packet-switched coverage, e.g., in areas with or without circuit-switched coverage or in networks that have no circuit-switched access backup. These solutions may be used to provide improved call origination and termination key-performance indicators, KPIs, for call setup success rate. The solutions may be selectively employed, in some embodiments, to provide coordinated retries of bearer setup between PGW, PCC, and IMS, thereby avoiding parallel retries by PGW, P-CSCF, IMS AS, and UE, and avoiding retries on same network resources in the event that there is a permanent or long-standing failure cause.

Figure 6:
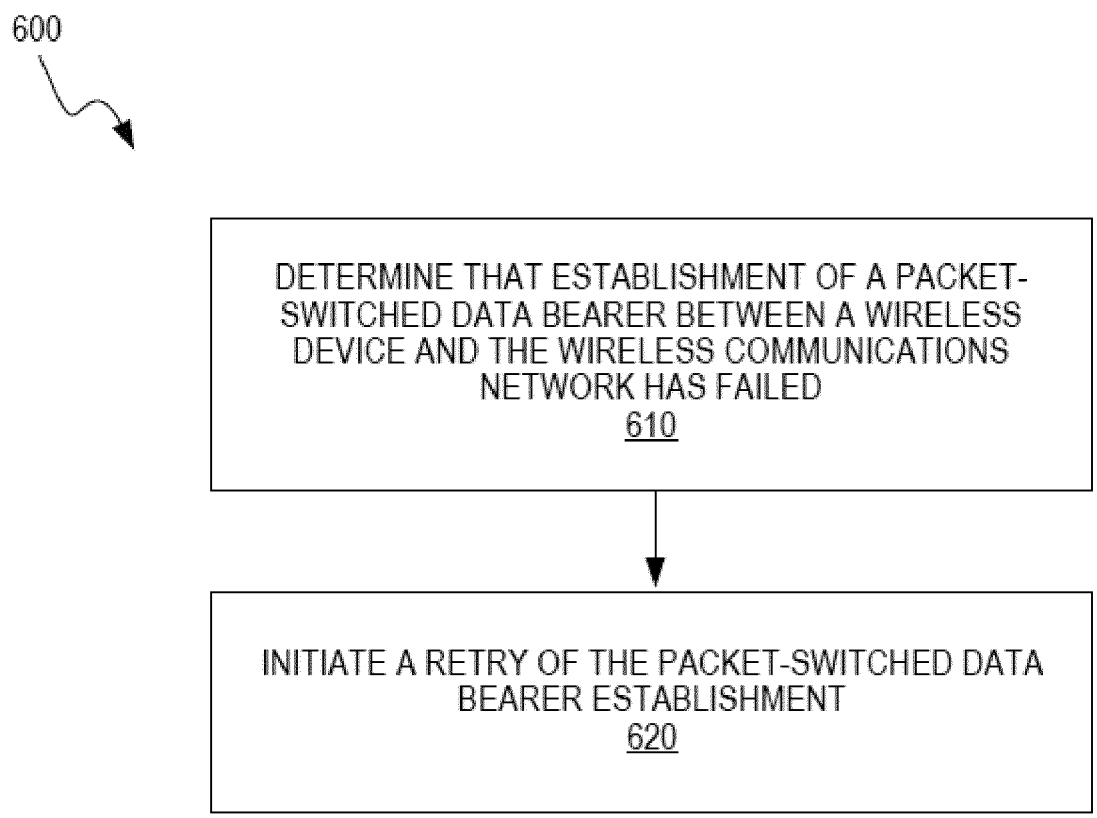
FIG. 6 is a flow chart of an example of a method in accordance with the present disclosure.

FIG. 6 is a process flow diagram illustrating an example method 600 according to some embodiments of the presently disclosed techniques, as implemented in a network node of a wireless communications network, for responding to failed bearer setups. The network node may be, for example, a PGW or a P-CSCF, in various embodiments.

As seen at block 610, the illustrated method comprises determining that establishment of a packet-switched data bearer between a wireless device and the wireless communications network has failed. As shown at block 620, the method further comprises initiating a retry of the packet-switched data bearer establishment.

In some embodiments, initiating the retry of the packet-switched data bearer establishment is responsive to determining that a cause of the failure of the packet-switched data bearer establishment is temporary. This may be determined, for example, based on a cause code corresponding to the failure of the packet-switched data bearer establishment. In some embodiments, for instance, determining that the cause of the failure is temporary may comprise comparing the cause code to a previously determined list of one or more cause codes, where a match to a particular cause code triggers a retry of dedicated data bearer establishment. In some embodiments, the list of one or more cause codes is pre-configured; in some embodiments, the list of one or more cause codes is received from another network node, e.g., a P-CSCF.

In some embodiments of the method illustrated in FIG. 6, the network node is a packet data network gateway (PGW), and initiating the retry of the packet-switched data bearer establishment is responsive to a determination that a packet-switched bearer establishment retry is permitted. Determining that the packet-switched bearer establishment retry is permitted may be based on configuration information received from another network node, e.g., a P-CSCF.

In some embodiments, initiating the retry of the packet-switched data bearer establishment is responsive to determining that circuit-switched fallback for the failed packet-switched data bearer establishment is not available. In some embodiments, initiating the retry of the packet-switched data bearer establishment may be conditioned on determining that the packet-switched access is not overloaded—this may be done based on a cause code associated with the data bearer establishment failure, for example.

In some embodiments of the method illustrated in FIG. 6, initiating the retry of the packet-switched data bearer establishment comprises sending, towards the wireless device, an indication to retry packet-switched bearer establishment by retrying call setup. This indication may indicate that the wireless device is to retry packet-switched bearer establishment on the condition that circuit-switched access is unavailable, for example. In some embodiments, this indication may indicate that the wireless device is to perform a new IP Multimedia Subsystem (IMS) registration.

In other embodiments of the method illustrated in FIG. 6, initiating the retry of the packet-switched data bearer establishment comprises sending, towards an IP Multimedia Subsystem (IMS) application server (AS), an indication to retry packet-switched bearer establishment by retrying call setup. This indication may comprise an indication that the IMS AS is to retry packet-switched bearer establishment with the wireless device using a different packet-switched access network, in some embodiments. In some embodiments, the indication may comprise an indication that the IMS AS is to try packet-switched bearer establishment with a second wireless device associated with the wireless device.

Figure 7:
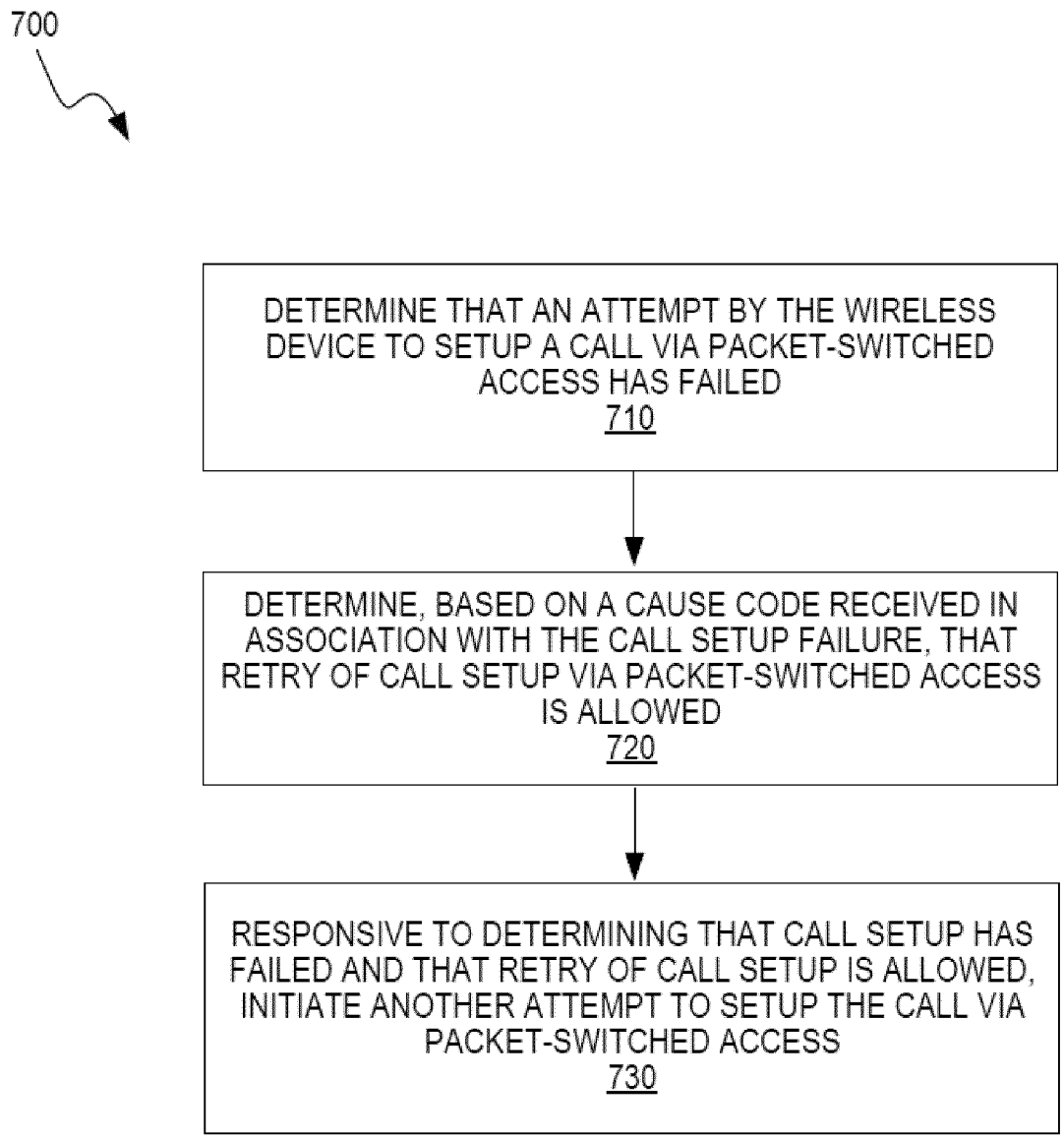
FIG. 7 is a process flow diagram illustrating an example method, implemented in a wireless device.

FIG. 7 is a process flow diagram illustrating another example method for responding to failed bearer setups, in this case as implemented in a wireless device, e.g., a UE, operating in a wireless communications network. As shown at block 710, method 700 includes determining that an attempt by the wireless device to setup a call via packet-switched access has failed. As shown at block 720, the method further comprises determining, based on a cause code received in association with the call setup failure, that retry of call setup via packet-switched access is allowed. Finally, as shown at block 730, the method comprises initiating another attempt to setup the call via packet-switched access, responsive to determining that call setup has failed and that retry of call setup is allowed.

In some embodiments of the method shown in FIG. 7, initiating another attempt to setup the call comprises selecting a different proxy-call session control function (P-CSCF), performing a new initial registration, and retrying an originated call setup via packet-switched access. In other embodiments, initiating another attempt to setup the call comprises tearing down and re-establishing a packet data network (PDN) connection, selecting a proxy-call session control function (P-CSCF), performing a new initial registration, and retrying an originated call setup via packet-switched access. In any of these embodiments, the method may further comprise receiving, from the wireless communications network, in response to failure of a packet-switched data bearer establishment, an indication of which of two or more procedures for initiating another attempt to setup the call should be followed. This indication may be a cause code associated with the failure of the call setup.

In some embodiments of the method shown in FIG. 7, the initiating of another attempt to setup the call is further responsive to determining that a timer governing retries of call setup has not expired. In some of these and in some other embodiments, the initiating of another attempt to setup the call is further responsive to determining that a maximum number of retries has not been reached.

Figure 8:
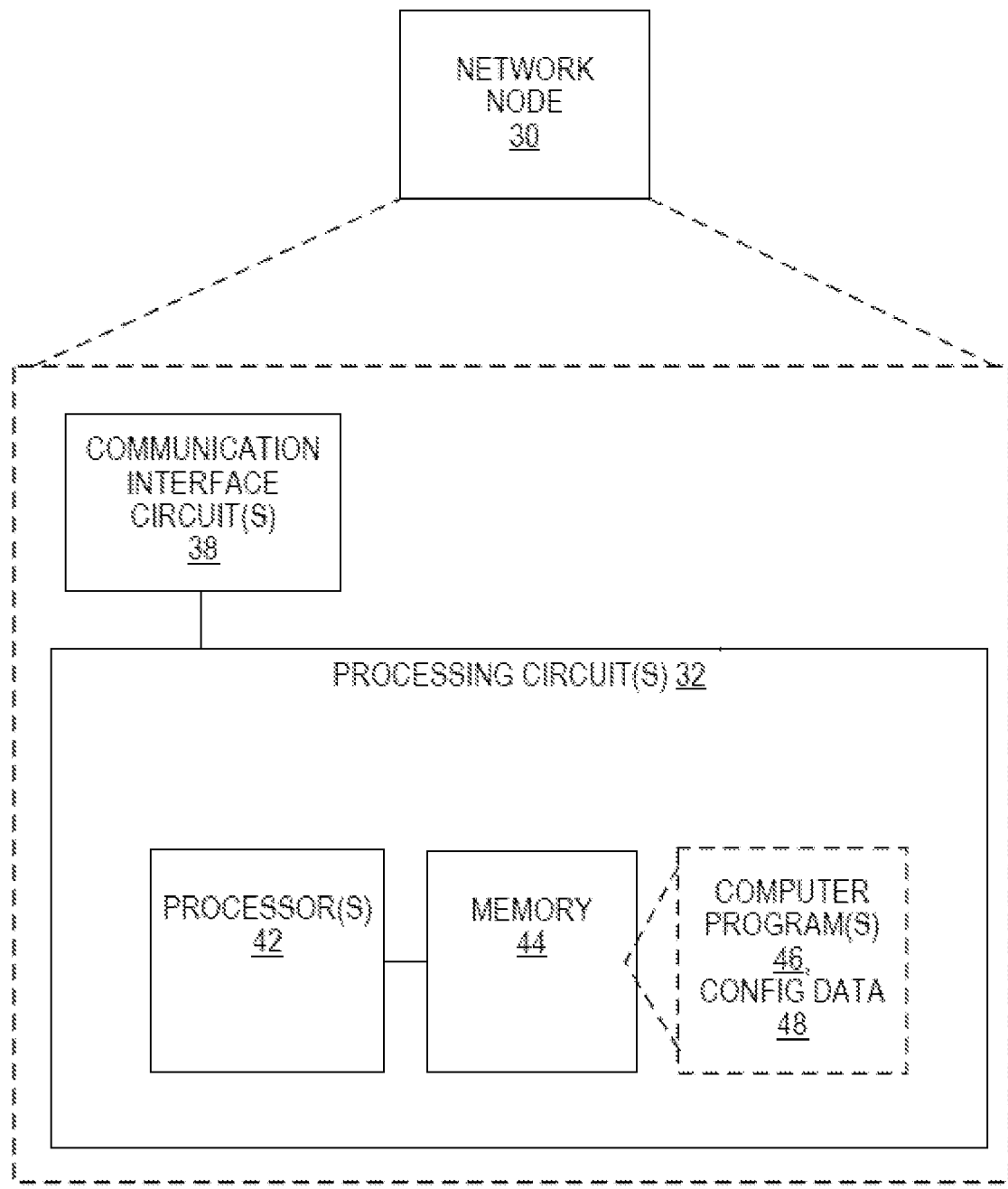
FIG. 8 illustrates an example network node.

FIG. 8 is a block diagram illustrating an example network node in a wireless communication system (e.g., an LTE/EPC system) in which embodiments of the present disclosure may be implemented. Network node 30 may be a PGW, for example, or a P-CSCF.

As illustrated in FIG. 8, the network node 30 includes processing circuitry 32 comprising one or more processors 42 (e.g., CPUs, ASICs, FPGAs, and/or the like) and a memory 44 that stores computer programs 46 and, optionally, configuration data 48. The network node 30 may include communication interface circuitry 38 to communicate with the other networks, e.g., in the Radio Access Network (RAN), the Evolved Packet Core (EPC), and/or the IMS. In some embodiments, the functionality of the network node 30 described herein may be fully or partially implemented in software that is, for example, stored in the memory 44 and executed by the processor(s) 42.

In some embodiments, the memory 44 of the network node 30 stores instructions that when executed by one or more of the processors 42 configures the network node 30 to carry out one or more of the techniques described herein. Network node 30, whether operating alone or in combination with one or more other network nodes, may be configured to carry out the method illustrated in FIG. 6, for example, and variants thereof.

Figure 9:
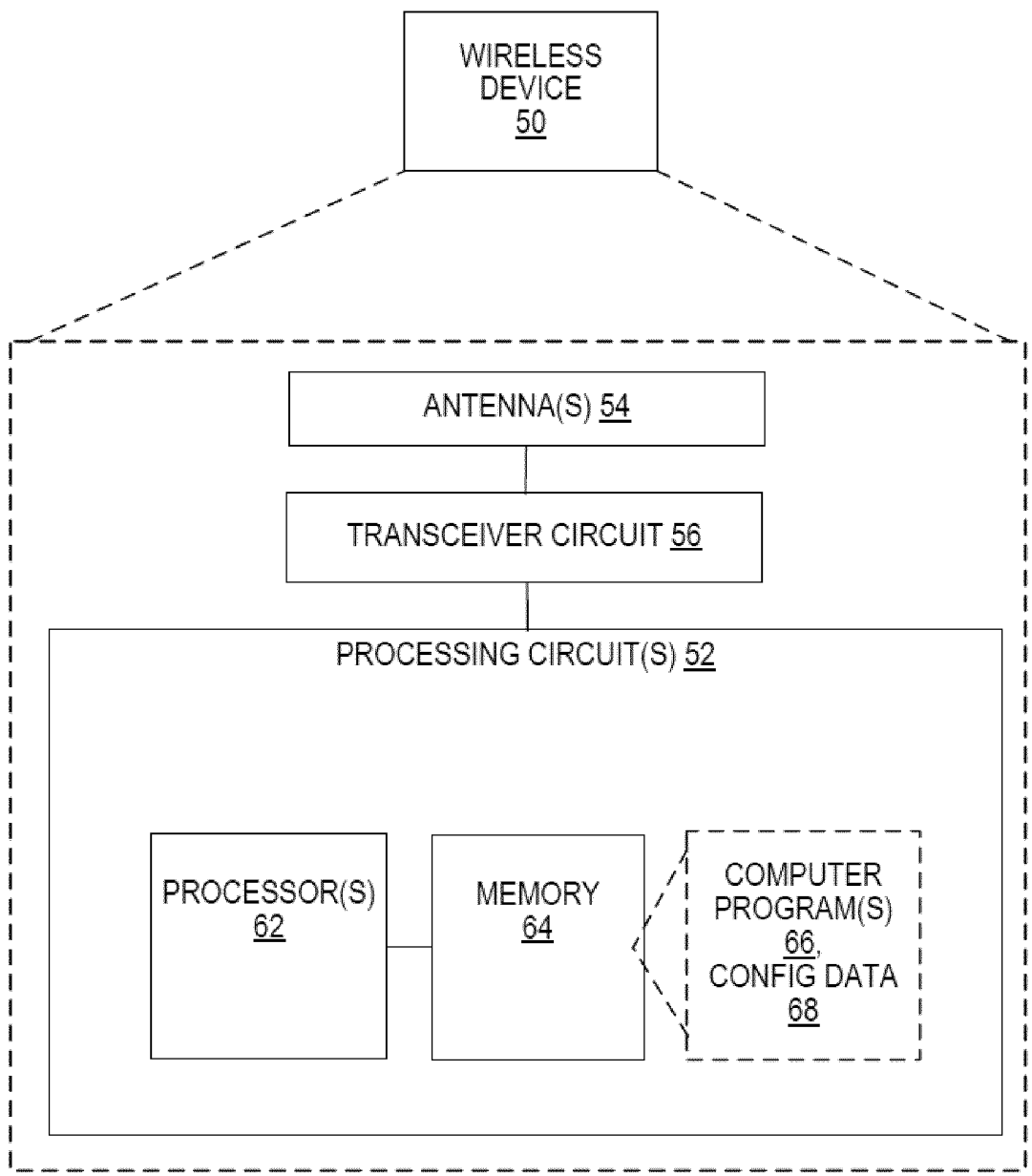
FIG. 9 illustrates an example wireless device.

FIG. 9 illustrates a block diagram of a wireless device 50 in a wireless communication system (e.g., a cellular communications system) in which embodiments of the present disclosure may be implemented. The wireless device 50 may be a UE. The term "UE" is used herein in its broad sense to mean any wireless device. As such, the terms "wireless device" and "UE" may be used interchangeably herein. In general, the wireless device 50 may additionally represent a target device, a D2D UE, a machine type UE, or a UE capable of Machine-to-Machine (M2M) communication, a sensor equipped with a UE, an iPAD, a tablet, a mobile terminal, a smart phone, Laptop Embedded Equipped (LEE), Laptop Mounted Equipment (LME), Universal Serial Bus (USB) dongles, Customer Premises Equipment (CPE), an IoT (Internet of Things) capable device, or any other device capable of communicating with a 4G or 5G network, etc.

As illustrated in FIG. 9, the wireless device 50 includes processing circuitry 52 comprising one or more processors 62 (e.g., Central Processing Units (CPUs), Application Specific Integrated Circuits (ASICs), Field Programmable Gate Arrays (FPGAs), and/or the like) and a memory 64 that stores computer programs 68 and, optionally, configuration data 68. The wireless device 50 also includes transceiver circuitry 56, including one or more transmitters or receivers coupled to one or more antennas 54. In some embodiments, the functionality of the wireless device 50 described above may be fully or partially implemented in software (e.g., computer programs 66) that is stored in the memory 64 and executed by the processor(s) 62.

In some embodiments, a carrier containing the computer program products described herein is provided. The carrier is one of an electronic signal, an optical signal, a radio signal, or a computer readable storage medium (e.g., a non-transitory computer readable medium such as memory).

In some embodiments, a computer program including instructions which, when executed by at least one processor, causes the at least one processor of the wireless device 50 to carry out any of the UE-related techniques described herein. Wireless device 50 or a similar wireless device may be configured, for example, to perform the method 700 shown in FIG. 7.

Other embodiments of the inventive techniques and apparatus disclosed herein include computer programs and computer program products including instructions that, when executed by at least one processor of the wireless device 50, cause the at least one processor of the wireless device 50 to carry out one or more of the methods described above. Similarly, embodiments include computer programs and computer program products including instructions that, when executed by at least one processor of a network node, cause the at least one processor of the network node 30 to carry out one or more of the methods described above for network node 30.

Figure 10:
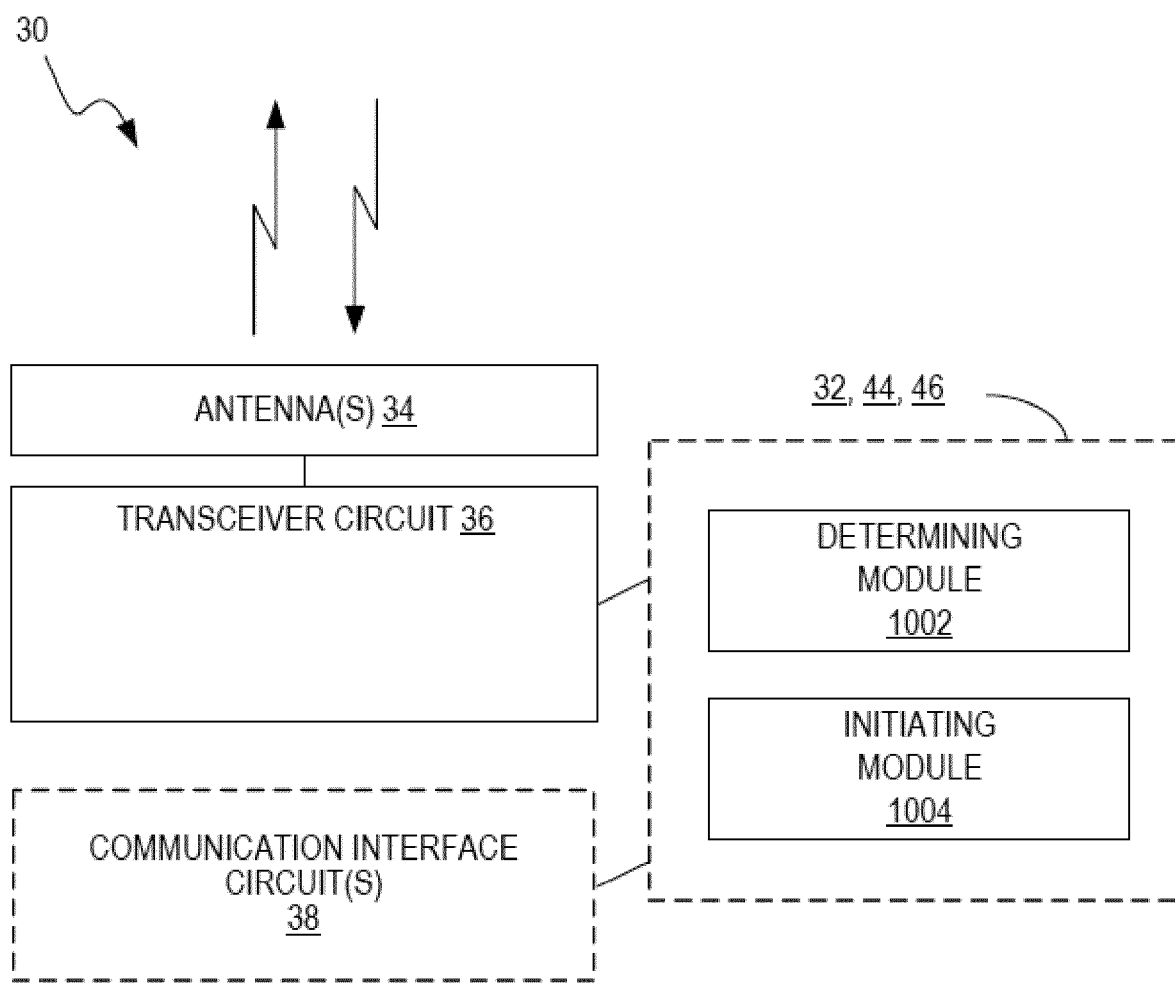
FIG. 10 is another representation of an example network node.

FIG. 10 is a schematic block diagram of a network node according to some other embodiments of the present disclosure. The node includes one or more modules, each of which is implemented in software. The module(s) provide the functionality of the network node, according to several embodiments, and include a determining module 1002 for determining that establishment of a packet-switched data bearer between a wireless device and the wireless communications network has failed; and an initiating module 1004 for initiating a retry of the packet-switched data bearer establishment.

Figure 11:
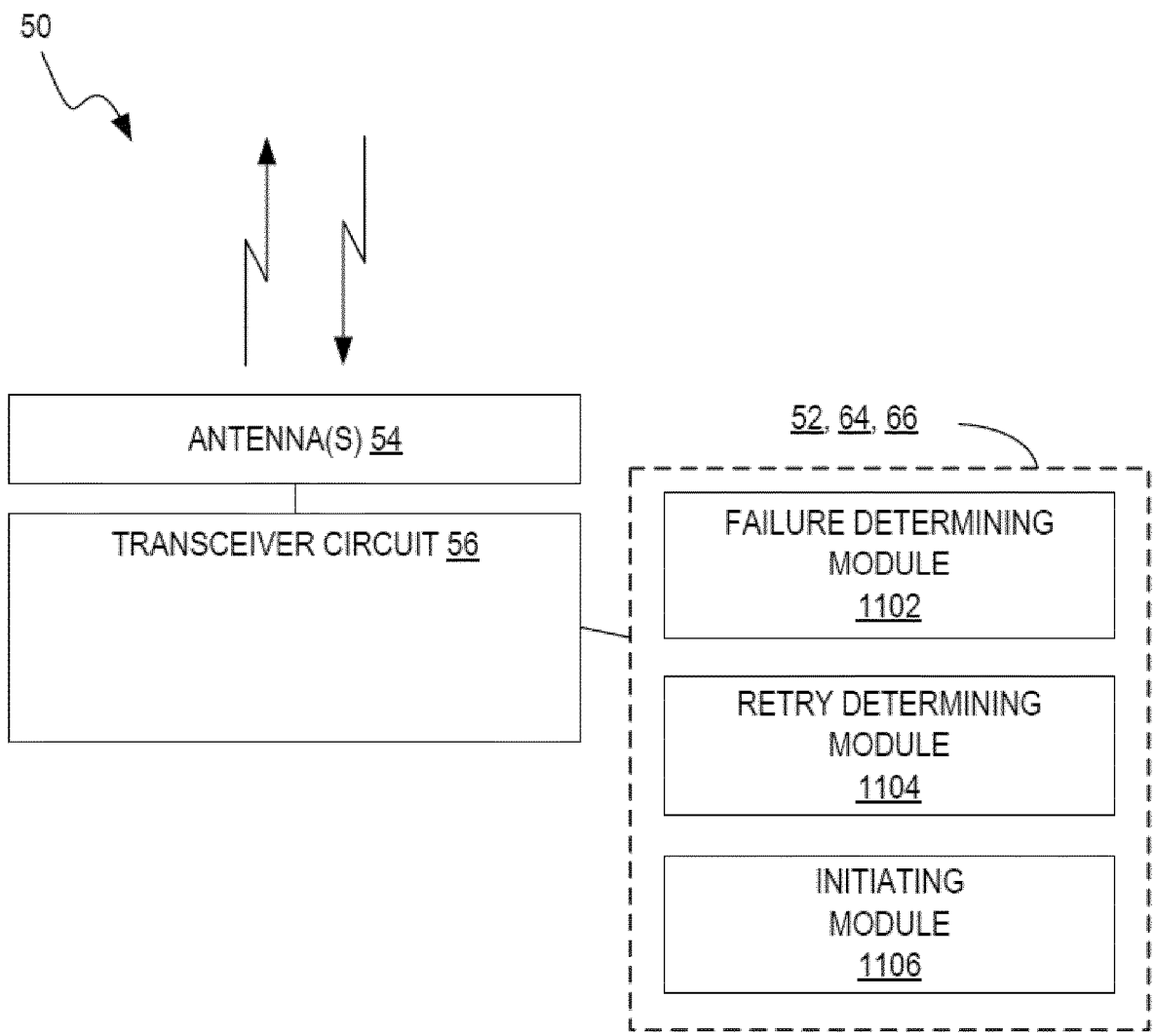
FIG. 11 is another representation of an example wireless device.

Similarly, FIG. 11 is a schematic block diagram of a wireless device 50 according to some other embodiments of the present disclosure. The node includes one or more modules, each of which is implemented in software. The module(s) provide the functionality of the wireless device according to any of the several UE-related techniques described herein, and include a failure determining module 1102 for determining an attempt by the wireless device to setup a call via packet-switched access has failed, and a retry determining module 1104 for determining, based on a cause code received in association with the call setup failure, that retry of call setup via packet-switched access is allowed. The modules further include an initiating module 1106 for, responsive to determining that call setup has failed and that retry of call setup is allowed, initiating another attempt to setup the call via packet-switched access.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality.

A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of establishing a Voice over Internet Protocol (VoIP) call between a calling User Equipment (UE) and a called UE, wherein said calling UE is served by a packet switched (PS) core network via a radio access network (RAN) and wherein a bearer is to be established between said calling UE and a gateway node in said PS core network, over said RAN, for obtaining access to an Internet Protocol (IP) multimedia subsystem (IMS) network, wherein said method comprises:
receiving, by an IMS Call Session Control Function (CSCF) node, a notification message thereby notifying said IMS CSCF node that said VoIP call establishment is in progress;
enabling, by said IMS CSCF node, retry of said establishment of said bearer between said calling UE and said gateway node, over said RAN, in case said establishment of said bearer has failed due to a temporary failure.

2. The method of claim 1, wherein said enabling comprises:
providing, by said IMS CSCF node, to said gateway node, a list of failure cause codes for which said gateway node is allowed to retry establishment of said bearer.

3. The method of claim 1, wherein said enabling comprises:
receiving, by said IMS CSCF node, a failure message thereby indicating that said bearer establishment between said calling UE and said gateway node has failed;
determining, by said IMS CSCF node, that said failure message comprises an indication that said failure is temporary;
requesting, by said IMS CSCF node, said gateway node, to retry to establish said bearer between said calling UE and said gateway node.

4. The method of claim 1, wherein said enabling comprises:
receiving, by said IMS CSCF node, a failure message thereby indicating that said bearer establishment between said calling UE and said gateway node has failed;
determining, by said IMS CSCF node, that said failure message comprises an indication that said failure is temporary;
requesting, by said IMS CSCF node, said calling UE to either retry to establish said VoIP call between the calling UE and said called UE via said RAN or to request said calling UE to re-register to said IMS network.

5. The method of claim 1, wherein said temporary failure is based on any of
a RAN cause code;
a Non Access Stratum (NAS) cause code;
a General Packet Radio Service Tunnelling Protocol (GTP) cause code; and
a diameter result code.

6. A method of establishing a Voice over Internet Protocol (VoIP) call between a calling User Equipment (UE) and a called UE, wherein said calling UE is served by a packet switched (PS) core network via a radio access network (PS-RAN) and wherein a bearer is to be established between said calling UE and a gateway node in said PS core network, over said RAN, for obtaining access to an Internet Protocol (IP) multimedia subsystem (IMS) network, wherein said method comprises:
establishing, by said gateway node, said bearer between said calling UE and said gateway node;
determining, by said gateway node, that said bearer establishment has failed due to a temporary failure;
retrying to establish, by said gateway node, said bearer between said calling UE and said gateway node.

7. The method of claim 6, wherein said method further comprises:
receiving, by said gateway node, from an IMS Call Session Control Function (CSCF) node, a list of failure cause codes for which said gateway node is allowed to retry establishment of said bearer; and
wherein said determining comprises determining, by said gateway node, that said bearer establishment has failed due to a temporary failure based on said received list of failure cause codes.

8. A method for establishing a Voice over Internet Protocol (VoIP) call between a calling User Equipment (UE) and a called UE, wherein said calling UE is served by a packet switched (PS) core network via a radio access network (RAN) and wherein a bearer is to be established between said calling UE and a gateway node in said PS core network, over said RAN, for obtaining access to an Internet Protocol (IP) multimedia subsystem (IMS) network, wherein said method comprises:
transmitting, by said calling UE, a request message for requesting establishment of said VoIP call;
receiving, by said calling UE, a service unavailable message indicating that said establishment of said bearer has failed and comprising an indication that said calling UE should retry said establishment of said VoIP call;
re-transmitting, by said calling UE, said request message for requesting establishment of said VoIP call of requesting, by said calling UE, re-registration in said IMS network.

9. An Internet Protocol (IP) Multimedia Subsystem (IMS) Call Session Control Function (CSCF) node for supporting establishment of a Voice over Internet Protocol (VoIP) call between a calling User Equipment (UE) and a called UE, wherein said calling UE is served by a packet switched (PS) core network via a radio access network (RAN) and wherein a bearer is to be established between said calling UE and a gateway node in said PS core network, over said RAN, for obtaining access to said IMS network, wherein the IMS CSCF node comprises:
receiver circuitry configured to receive a notification message thereby notifying said IMS node that said VoIP call establishment is in progress; and
processing circuitry configured to enable retry to establish said bearer between said calling UE and said gateway node, over said RAN, in case said establishment of said bearer has failed due to a temporary failure.

10. The IMS CSCF node of claim 9, wherein said IMS CSCF node further comprises:
   transmitter circuitry configured to provide a list of failure cause codes for which said gateway node is allowed to retry establishment of said bearer.

11. The IMS CSCF node of claim 9, wherein said processing circuitry is further configured to:
   receive a failure message thereby indicating that said bearer establishment between said calling UE and said gateway node has failed;
   determine that said failure message comprises an indication that said failure is temporary;
   request said gateway node to retry to establish said bearer between said calling UE and said gateway node.

12. The IMS CSCF node of claim 9, wherein said processing circuitry is further configured to:
   receive a failure message thereby indicating that said bearer establishment between said calling UE and said gateway node has failed;
   determine that said failure message comprises an indication that said failure is temporary;
   request said calling UE to retry to establish said Voice over Internet Protocol (VoIP) call between a calling User Equipment (UE) and said called UE via said radio access network, RAN.

13. The IMS CSCF node of claim 9, wherein said temporary failure is based on any of
   a Radio Access Network (RAN) cause code;
   a Non Access Stratum (NAS) cause code;
   a General Packet Radio Service Tunnelling Protocol (GTP) cause code; and
   a diameter result code.

14. A Calling User Equipment (UE) for establishing a Voice over Internet Protocol (VoIP) call between said calling UE and a called UE, wherein said calling UE is served by a packet switched (PS) core network via a radio access network (RAN) and wherein a bearer is to be established between said calling UE and a gateway node in said PS core network, over said RAN, for obtaining access to an Internet Protocol (IP) multimedia subsystem (IMS) network, wherein the calling UE comprises:
   transmitter circuitry configured to transmit a request message for requesting establishment of said VoIP call;
   receiver circuitry configured to receive a service unavailable message indicating that said establishment of said bearer has failed and comprising an indication that said calling UE should retry said establishment of said VoIP call; and
   processing circuitry configured to use the transmitter circuitry to re-transmit said request message for requesting establishment of said VoIP call, in response to said indication.

* * * * *